United States Patent
Ammi

(10) Patent No.: US 7,461,439 B2
(45) Date of Patent: Dec. 9, 2008

(54) METHOD FOR DETECTING MALFUNCTION IN CLAMPING AND MACHINE TOOL

(75) Inventor: Sadatsune Ammi, Toyama (JP)

(73) Assignee: Nippei Toyama Corporation, Tokyo (JP)

(*) Notice: Subject to any disclaimer, the term of this patent is extended or adjusted under 35 U.S.C. 154(b) by 0 days.

(21) Appl. No.: 11/770,077

(22) Filed: Jun. 28, 2007

(65) Prior Publication Data

US 2008/0042682 A1    Feb. 21, 2008

(30) Foreign Application Priority Data

Jun. 29, 2006    (JP)    ............ P. 2006-180084

(51) Int. Cl.
*B23P 23/00*    (2006.01)
*B23B 27/00*    (2006.01)

(52) U.S. Cl. .............. 29/27 C; 409/131; 82/1.11; 700/175; 324/76.11; 324/722; 318/625

(58) Field of Classification Search ............ 29/27 C; 409/131, 132, 136, 186, 193; 82/1.11, 173; 700/175; 324/71.1, 76.11, 722, 133; 318/625
See application file for complete search history.

(56) References Cited

U.S. PATENT DOCUMENTS

| | | | |
|---|---|---|---|
| 3,641,849 A | * | 2/1972 | Kinney ............ 82/173 |
| 3,866,212 A | * | 2/1975 | Simon et al. ............ 341/114 |
| 4,629,956 A | * | 12/1986 | Nozawa et al. ............ 318/625 |
| 6,758,640 B2 | * | 7/2004 | Mizutani et al. ............ 409/131 |
| 7,056,072 B2 | * | 6/2006 | Mizutani et al. ............ 409/131 |
| 7,183,735 B2 | * | 2/2007 | Heinemann ............ 318/565 |

FOREIGN PATENT DOCUMENTS

JP    2002-239873 A    8/2002

* cited by examiner

*Primary Examiner*—Dana Ross
(74) *Attorney, Agent, or Firm*—Sughrue Mion, PLLC

(57) ABSTRACT

The method for detecting any clamping malfunction of the work within the machine tool which clamps both ends of the work with clamping mechanisms 23, 24 of a pair of headstocks 19, 29, and processes the work by spinning the work through synchronous rotation of main spindles 21, 22 of the pair of headstocks by servomotors 33, 34, wherein, after clamping the both ends of the work 27 with the clamping mechanisms 23, 24 of the respective headstocks 19, 20, and while both the servomotors 33, 34 of the headstocks are in a servo-ON state, a command for a minute angle α rotation is given to the servomotor 34 of only one of the headstocks, and at this point, any malfunction in clamping is determined when a current or torque generated within the servomotor of one or the other of the headstocks is smaller than a predetermined value.

4 Claims, 4 Drawing Sheets

METHOD FOR DETECTING MALFUNCTION IN CLAMPING AND MACHINE TOOL

BACKGROUND OF THE INVENTION

1. Field of the Invention

The present invention relates to a method for detecting a malfunction in clamping a work within a machine tool and a machine tool performing the same.

2. Description of Related Art

In a grinding machine which grinds a work having a relatively elongated shaft-like shape, such as a crankshaft, both ends of a work are clamped by clamping mechanisms provided on a right-and-left pair of head stocks, and the work is machined while synchronously rotating main spindles of the pair of headstocks by servomotors as described in Japanese Patent Unexamined Publication JP-A-2002-239873. The clamping mechanisms use hydraulic chucks which chuck the work from the outer periphery of the work by chucking pawls driven by hydraulic chuck cylinders. The verification whether these clamping mechanisms have or have not properly clamped the work has been performed by using a pressure switch to check whether a specified pressure of operation fluid supplied to the chuck cylinder has been reached or not.

However, when there is abnormality in the driving mechanism of the chuck pawl, such as poor functioning of chuck pawl due to chips entering into sliding sections of the chucking pawls, the chuck pawl does not clamp the work at a predetermined clamping force although the pressure of the operation fluid supplied to the chuck cylinder is normal. If the grinding operation starts in this state, the work may slip in the chuck due to grinding force, thereby to cause a grinding failure. Furthermore, when the chucking pawls are used while in a state that they have contaminants adhered thereon, or in a worn-out state, similarly, the work may slip to cause a grinding failure. That is, the detection of only the pressure of the hydraulic oil supplied to the chuck cylinder may not always detect clamp malfunction.

SUMMARY OF THE INVENTION

In the light of the current condition explained above, an object of the present invention is to provide a clamping malfunction detection method which allows accurate and simple detection of malfunction in clamping a work, and a machine tool performing the same.

In order to achieve the above-mentioned object, according to a first aspect of the invention, there is provided a method for detecting malfunction in clamping a work within a machine tool, which includes:

a pair of headstocks that includes claim mechanisms clamping both ends of the work, respectively; and a pair of servomotors synchronously rotating main spindles of the headstocks together with the work so as to machine the work, the method for detecting malfunction including:

clamping the both ends of the work with the clamping mechanisms of the both headstocks;

giving a command for a minute angle rotation to only one of the servomotor, while performing servo control on the servomotors;

detecting current or torque generated in the servo motors; and determining malfunction in clamping when the detected current or the torque in either of the servo motors is smaller than a predetermined value.

According to a second aspect of the invention, there is provided a method for detecting malfunction in clamping a work within a machine tool, which includes:

a pair of headstocks that includes claim mechanisms clamping both ends of the work, respectively; and a pair of servomotors synchronously rotating main spindles of the headstocks together with the work so as to machine the work, the method for detecting malfunction including:

clamping the both ends of the work with the clamping mechanisms of the both headstocks, while performing servo control on the servomotors;

detecting current or torque generated in the servo motors; and determining malfunction in clamping when the detected current or the torque in either of the servo motors is not smaller than a predetermined value.

According to a third aspect of the invention, there is provided a machine tool including:

a pair of headstocks;

a pair of clamping mechanisms provided on main spindles of the respective headstocks;

a pair of servomotors which rotates the main spindles of the respective headstocks;

a detecting unit which detects a current or torque of the respective servomotors;

a machining unit which is movably provided so as to approach to and apart from a work clamped by the clamping mechanisms; and a clamping malfunction detecting unit, wherein the machine tool clamps the work by the clamping mechanisms, and machines the work by synchronously rotating the work together with the main spindles by the servomotors, wherein the clamping malfunction detecting unit detects malfunction in clamping in such a manner that:

clamping both ends of the work with the clamping mechanisms;

giving a command for a minute angle rotation to only one of the servomotor, while performing servo control on the servomotors;

detecting current or torque generated in the servo motors; and determining malfunction in clamping when the detected current or the torque in either of the servo motors is smaller than a predetermined value.

According to a fourth aspect of the invention, there is provided a machine tool including:

a pair of headstocks;

a pair of clamping mechanisms provided on main spindles of the respective headstocks;

a pair of servomotors which rotates the main spindles of the respective headstocks;

a detecting unit which detects a current or torque of the respective servomotors;

a machining unit which is movably provided so as to approach to and apart from a work clamped by the clamping mechanisms; and a clamping malfunction detecting unit, wherein the machine tool clamps the work by the clamping mechanisms, and machines the work by synchronously rotating the work together with the main spindles by the servomotors, wherein the clamping malfunction detecting unit detects malfunction in clamping in such a manner that:

clamping the both ends of the work with the clamping mechanisms of the both headstocks, while performing servo control on the servomotors;

detecting current or torque generated in the servo motors; and determining malfunction in clamping when the detected current or the torque in either of the servo motors is not smaller than a predetermined value.

According to the first aspect of the invention, after the work is clamped with the clamping mechanisms of the both headstocks, a command for a minute angle rotation is given to only one of the servomotor of the headstocks while performing servo control on the servomotor, so that the one servomotor attempts to rotate by that minute angle while the other attempts to remain in the current position without the rotation, causing current flow within both of the servomotors to generate torque. If any clamping malfunction is present, the work slips at the chucks of the clamping mechanisms, causing the current and torque of the servomotors to be smaller than a case where clamping is normally achieved. Thus, by determining a clamping malfunction when the current or torque generated in the servomotor of either of the headstock is smaller than a predetermined value, a clamping malfunction is precisely be detected. The method of the invention may be implemented in a simple manner without newly adding any special apparatus as long as there is a function of detecting the current or torque of the servomotor.

According to the second aspect of the invention, a work is clamped at its both ends with the clamp mechanisms of the respective headstocks while performing servo control on the servomotors of the both headstocks, and at this point, any clamping malfunction is determined when the current or torque generated within the servomotor of either of the headstock is equal to or larger than a predetermined value. Accordingly, the clamping malfunction is easily and precisely detected at the time of clamping the work.

According to the machine tool of the third aspect of the invention, it becomes possible to precisely and easily detect any malfunction in clamping a work by performing the clamp malfunction detection method according to the first aspect of the invention. Thus, the grinding failure due to the clamping malfunction is effectively prevented before it happens.

The machine tool according to the fourth aspect of the invention, it becomes possible to precisely and easily detect any malfunction in clamping of a work at the time of clamping the work by performing the clamp malfunction detection method according to the second aspect of the invention. Thus, the grinding failure due to the clamping malfunction is effectively prevented before it happens.

DETAILED DESCRIPTION OF EXEMPLARY EMBODIMENTS OF THE INVENTION

Embodiments

Figure 1:
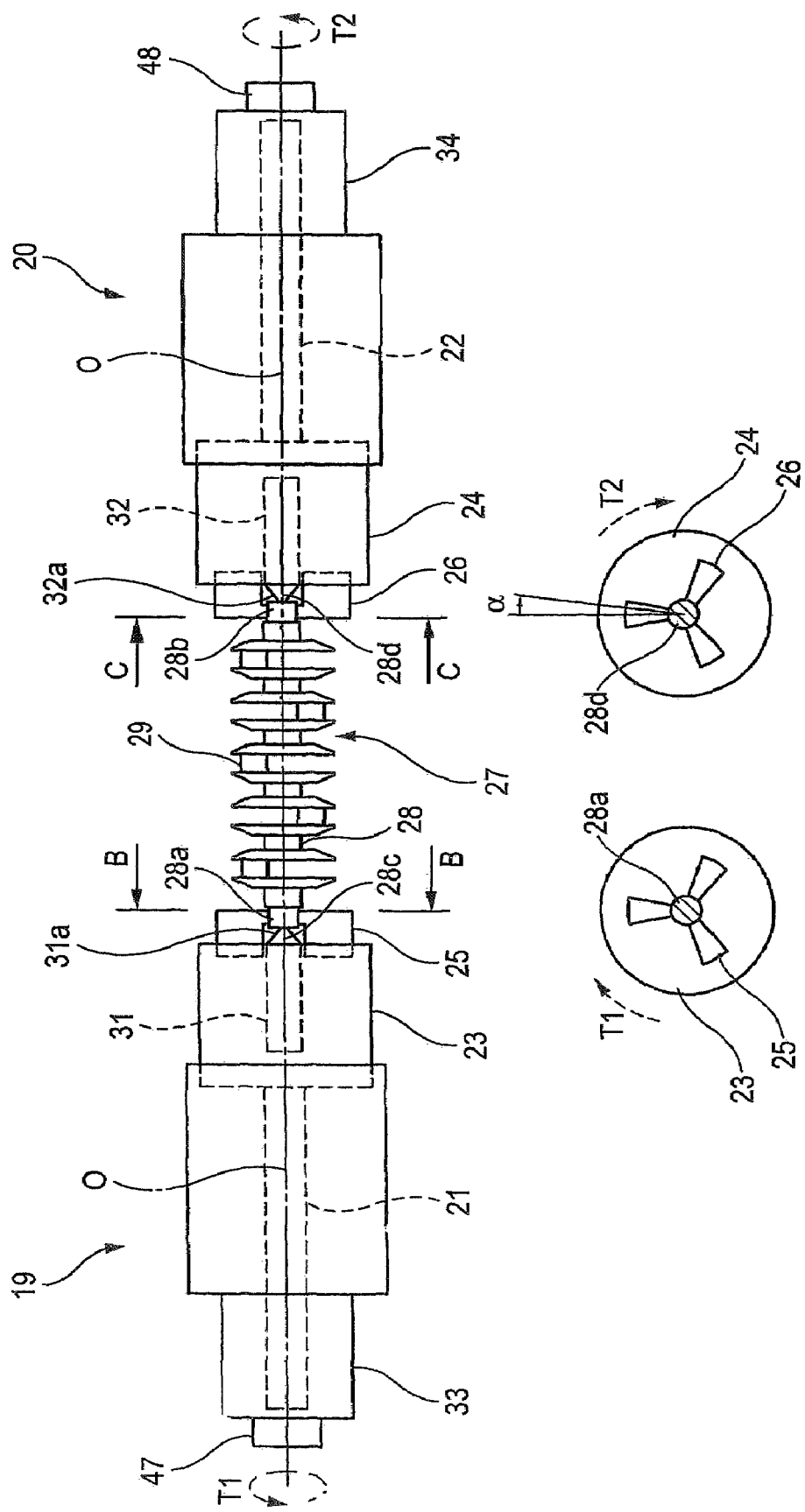
FIG. 1A shows a plane view of essential members of one embodiment of the present invention which is implemented as a crankshaft grinding machine.
FIG. 1B is a cross-sectional view of line B-B of FIG. 1A.
FIG. 1C is a cross-sectional view of line C-C of FIG. 1A.
Figure 2:
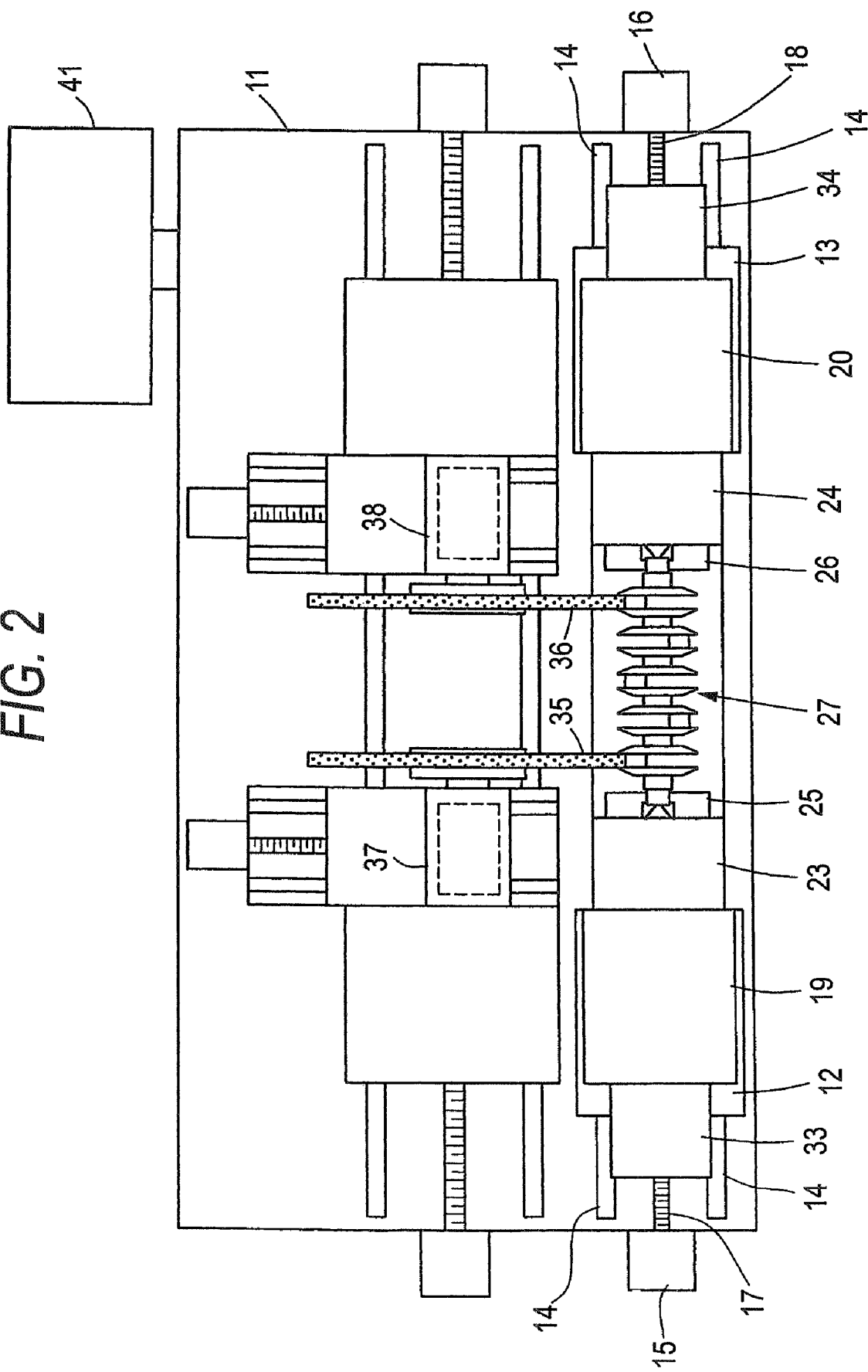
FIG. 2 is a plane view of the grinding machine.

The invention is hereinafter described according to one embodiment with reference to FIGS. 1 trough 4, which is embodied as a grinding machine for crankshafts. As seen in FIG. 2 which is a plane view of the grinding machine, over a top surface of a bed 11, a left-and-right pair of tables 12 and 13 are provided so as to be independently movable back and forth in the same direction over rails 14 that are laid down in parallel in a horizontal direction. On the left and right ends of the bed 11, table carrier motors 15 and 16 are provided, which are configured to move the tables 12 and 13 back and forth by feed screws 17 and 18.

Over the top surfaces of the tables 12 and 13, a first headstock 19 and a second head stock 20 are provided, and to their first and second main spindles, as shown in FIGS. 1A to 1C, first and second clamping mechanisms 23 and 24 are attached. To the first and second clamping mechanisms 23 and 24, first and second hydraulic chucks 25 and 26 are provided. Both ends of the chucks 25 and 26 are provided with three chucking pawls claiming a crankshaft 27 from its outer periphery.

The crankshaft 27 includes a plurality of journal sections 28 and a plurality of crankpins 29 eccentrically connected between the respective journal sections 28. Among the journal sections 28, a left-most journal section 28a and a right-most journal section 28b located on the left and right ends are configured so as to be clamped by the first and second chucks 25, 26. At the center sections of the first and second clamping mechanisms 23, 24, first and second centers 31, 32 are placed so as to be movable back and forth in their axial direction, and at the same time, are pressed against the left-most and right-most journal sections 28a and 28b by hydraulic mechanisms which are not shown in the drawing. By engaging tapered surfaces 31a, 32a formed on the ends of the first and second centers 31, 32 with center holes 28c, 28d formed on the left-most and right-most journal sections 28a, 28b, the crankshaft 27 is centered and held on a rotational axis line O of first and second main spindles 21, 22.

At the base end sections of the first and second headstocks 19 and 20, first and second servomotors 33, 34 are attached. Rotational axes of the first and second servomotors 33, 34 are connected with the first and second main spindles 21, 22 so as to allow the synchronous rotation of the first and second clamping mechanisms 23, 24 by the servomotors 33, 34.

Over the top surface of the bed 11, first and second grinding heads 37, 38 having grind wheels 35, 36 attached thereon are provided so as to be controllably movable in left and right and back and forth directions, in order to grind the crankpins 29 of the crankshaft 27 with the grind wheels 35, 36.

Figure 3:
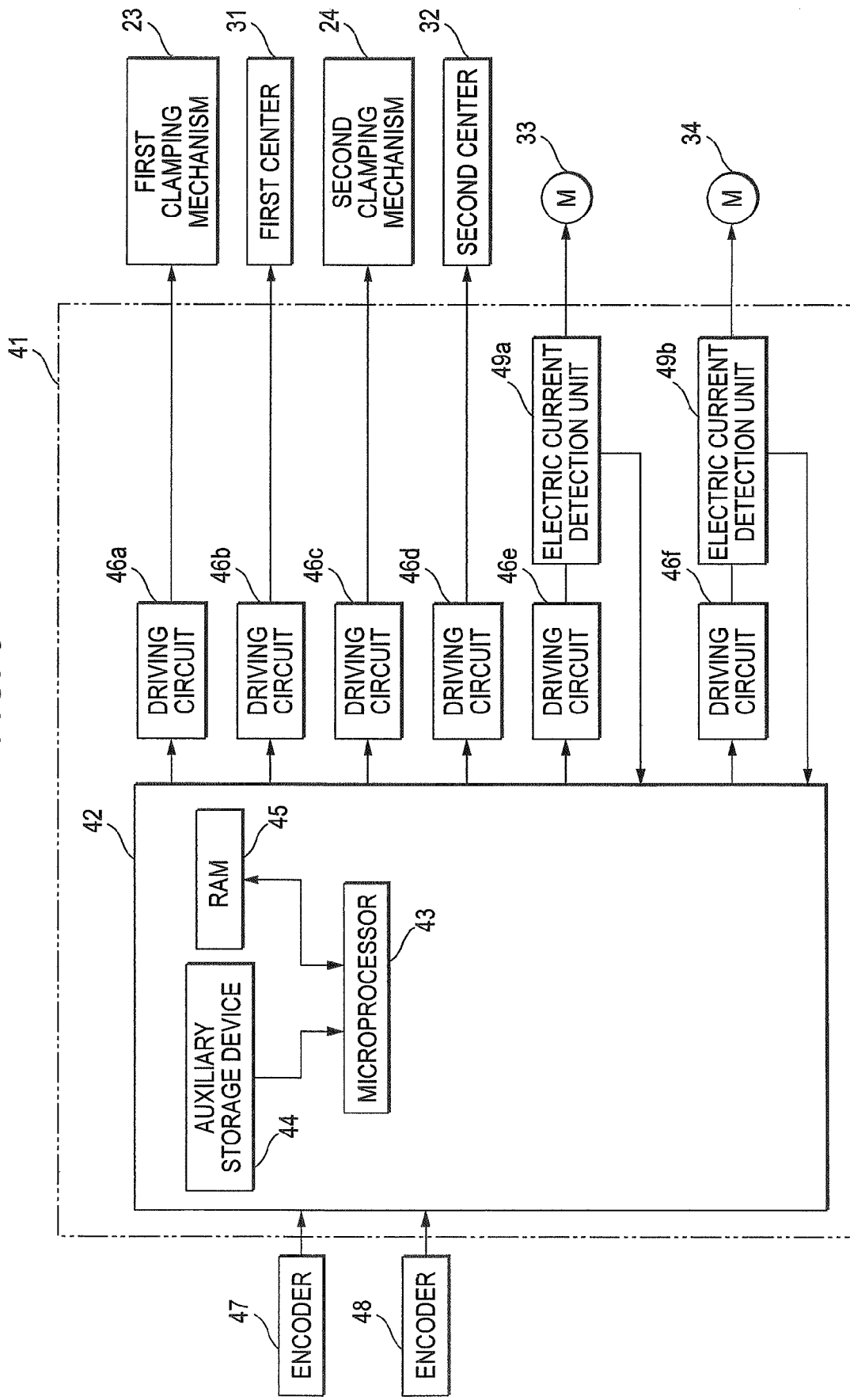
FIG. 3 is a block diagram of the controller of the grinding machine.

A controller 41 of the grinding machine will now be explained with reference to FIG. 3. The controller 41 includes a control section 42 including a microprocessor 43 which performs various controlling operations based on a control action program. Connected to the microprocessor 43 are; an auxiliary storage device 44 in which control action programs etc. are stored in advance; and a RAM (Random Access Memory) 45 for quickly accessing various data. To the control section 42, the first and second clamping mechanisms 23, 24, the first and second centers 31 and 32, and the first and second servomotors 33 and 34 are connected via driving circuits 46a, 46b, 46c, 46e and 46f. The driving circuits 46e, 46f for the first and second servomotors 33, 34 include electric current detection unit 49a, 49b for detecting electric currents flowing through the first and second servomotors 33 and 34, and the electric current detection unit 49a, 49b respectively detect the electric current in the first and second servomotors 33 and 34, and output electric current value signals to the control section 42. Furthermore, encoders 47 and 48 provided in the first and second servomotors 33 and 34 are connected to the control section 42, providing the control section 42 a feedback of rotation angle signals of the respective first and second main spindles 21, 22 as pulse data.

Figure 4:
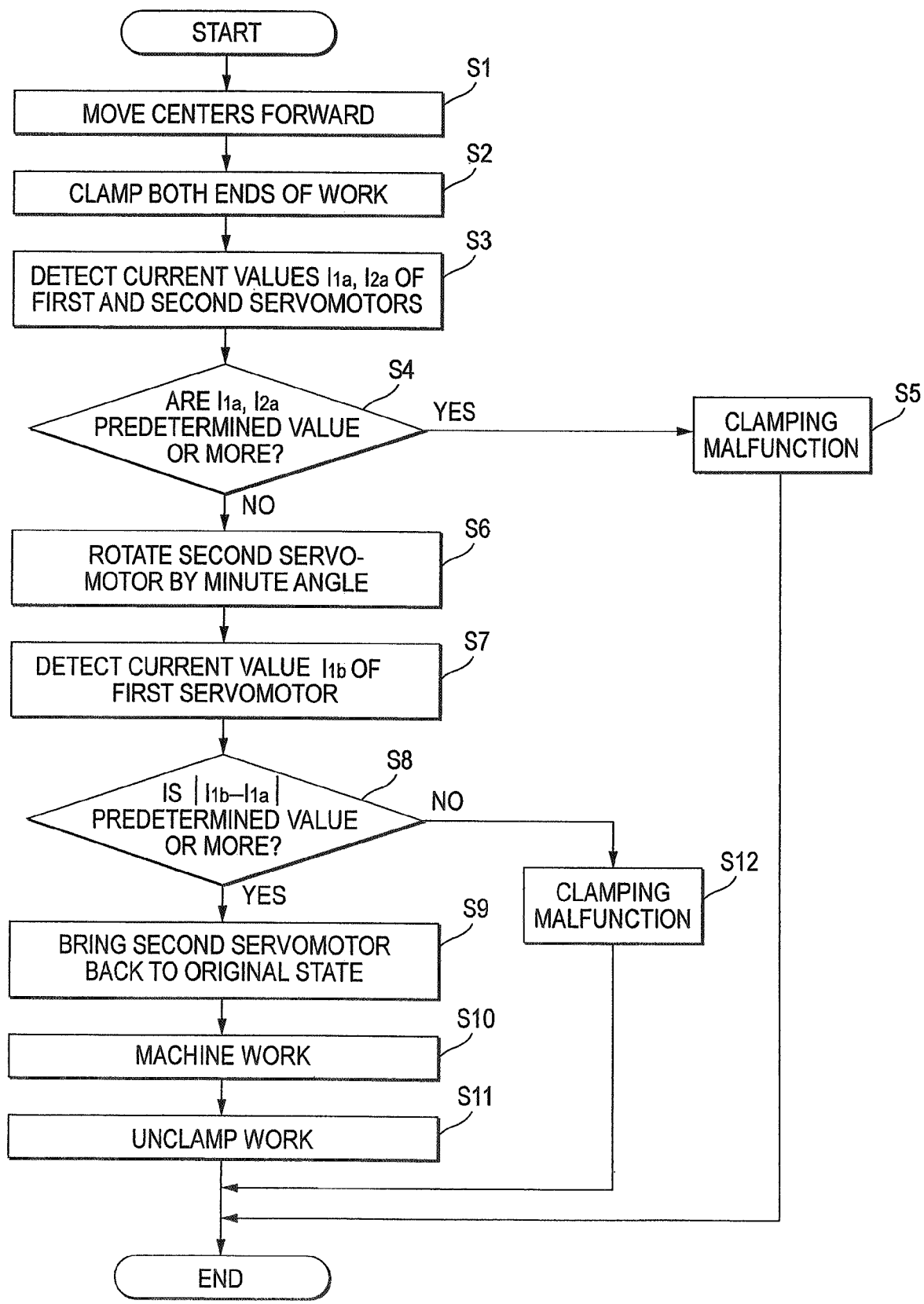
FIG. 4 is a flow chart showing the sequence of the operations of the grinding machine.

The operation of the crankshaft grinding machine configured as explained above will now be explained with reference to FIGS. 1A to 1C and the flow chart of FIG. 4. In order to clamp the crankshaft 27, first, table carrier motors 15, 16 are driven to move the tables 12, 13 in the directions that separate them from each other, and the first and second clamping mechanisms 23, 24 stops at their loading positions.

Next, the crankshaft 27 is placed between the first and second centers 31, 32 by a work supplying device not shown. By operating the table carrier motors 15, 16 to move the tables 12, 13 forward to have the center holes 28c, 28d of the crankshaft 27 engaged with the tapered surfaces 31a, 32a of the ends of the first and second centers 31, 31. Furthermore, by moving the first and second centers 31, 32 forward by hydraulic mechanisms that are not shown, to position the crankshaft 27 on the rotational axis line O of the main spindles (Step S1).

Next, while performing servo control on the first and second servomotors, the first and second clamping mechanisms 23, 24 are operated to clamp the left-most and right-most journal sections 28a, 28b with its first and second chucks 25, 26 (Step S2).

Thereafter, while the crankshaft 27 is being clamped with the first and second clamping mechanisms 23, 24 at its both ends as explained above, an electric current $I_{1a}$ flowing through the first servomotor 33 and an electric current $I_{2a}$ flowing through the second servomotor 34 are measured using signals from the electric current detection unit 49a, 49b, and these electric current values $I_{1a}$, $I_{2a}$ are stored within the RAM 45 (Step S3).

The electric current values $I_{1a}$, $I_{2a}$ of the first servomotor 33 and the second servomotor 34 detected from Step S3 should be almost 0 if the clamping state is proper and there is no torsion produced within the crankshaft 27. On the other hand, if there is any wear in the chucking pawls or malfunctioning of the chucking pawls, there should be a torsion produced within the crankshaft upon clamping, and there should be holding torques occurring within the first and second servomotors 33, 34, and electric currents according to these holding torques flow through the first and second servomotors 33, 34. The controller 41 compares these current values $I_{1a}$, $I_{2a}$ of the first and second servomotors 33, 34 at the time of clamping with predetermined values (Step S4). When the current values $I_{1a}$, $I_{2a}$ are equal to or higher than the specified values, the controller 41 determines that there is a claming malfunction (Step S5), and halt any later grinding operations. The predetermined values shall be set at a level near the upper limit of a range within which the torsion of the crankshaft 27 is so little as to cause no problem even if the grinding operation continues.

When the current values $I_{1a}$, $I_{2a}$ of the first and second servomotors 33, 34 are smaller than the predetermined value, the controller 41 outputs a command to have only the second servomotor 34 rotate by a minute angle α (Step S6).

By this command, as shown in FIG. 1A to 1C, the second servomotor 34 tends to rotate in a direction by the minute angle α to generate a torque T2, and the first servomotor 33 tends to stay in the current position, so that if there is no slippage at the chucking sections of the crankshaft 27, the torque T2 is transmitted to the first servomotor 33 via the crankshaft 27, and the first servomotor 33 produces a counter-torque T1 in an opposite direction of the torque T2 of the second servomotor 33. Within the first servomotor 33 and the second servomotor 34, the currents according to their torques T1, T2 flow through. At this time, the current value $I_{1b}$ of the first servomotor 33 is measured by a signal of the electric current detection unit 49a (Step S7).

Required amount of the minute angle α is determined by testing the crankshaft in advance in accordance with its type, and setting a minute angle which is; within a range that will generate loading torques in the first and second servomotors 33, 34 without promoting any adverse effect on the crankshaft 27 by the torque applied to the crankshaft 27; and at the same time, at a level necessary to verify that there is no slippage in the chucking sections due to grinding force upon grinding the crankshaft 27. Also, when deciding upon a minute angle α in this manner, magnitude of the electric current flowing through the first servomotor 33 while in a proper clamping state is measured in the case where the command of the minute angle rotation is given only to the second servomotor 34, and based on that measurement result, the later-described values are determined.

Thereafter, an amount of change $|I_{1b}-I_{1a}|$ in the current value of the first servomotor 33 between the values before and after giving the rotation command to the second servomotor 34 is calculated, and by determining whether or not this value is equal to or larger than a predetermined value specified in advance, the presence or absence of any clamping anomaly is determined (Step S8).

If the amount of change in the current value of the first servomotor 33 $|I_{1b}-I_{1a}|$ is equal to or larger than the predetermined value, there is a prescribed counter-torque T2 working on the first servomotor 33, and it may be determined that there is no slippage in the chucking sections, so that the clamping state may be determined to be proper. Therefore, after the second servomotor 34 is brought back to its original angle (Step S9), the first servomotor 33 and the second servomotor 34 are synchronously rotated to rotate the crankshaft 27, and while the crankpins 29 are revolved around the rotational axis line O, the crankpins 29 are ground by the grind wheels 35, 36 (Step S10).

Finally, the first headstock 19 and the second headstock 20 go back to their loading positions to dissolve the clamping state of the first and second clamping mechanisms 23, 24 and to retract the first and second centers 31, 32, and then the crankshaft 27 is taken out (Step S11).

On the other hand, if the amount of change in the current value of the first servomotor 33 $|I_{1b}-I_{1a}|$ is smaller than the predetermined value, that indicates that the prescribed counter torque T2 is not working on the first servomotor 33. Thus, it is determined that there is a slippage in the chucking section of the first clamping mechanism 23 or the second clamping mechanism 24, and a clamping malfunction is determined (Step S12), and the grinding operation is suspended.

As explained heretofore, the grinding machine can perform the checking for any clamping malfunction at the time of clamping in the steps S3 and S4, as well as the sequence of the operations in the steps S6 through S8 to check whether there is any slippage in the chucking sections between the crankshaft 27 and the first and second clamping mechanisms 23, 24 to accurately detect the clamping malfunction. Since the grinding operation is suspended when any clamping malfunction is detected, grinding failure is prevented in advance. Also, it may easily be implemented without adding any special instrument as long as there provided the function to detect the electric current values of the first and second servomotors 33, 34.

The invention is not limited to the aforementioned embodiment. In the above embodiment, a clamp malfunction is detected in two stages, the steps S4 and S7, however, it is also possible to implement only one of them. Furthermore, in the above embodiment, the clamping malfunction is detected by reading the electric current values of the first servomotor 33 before and after the command for minute angle α rotation is given to the second servomotor 34, and comparing the amount of change in the current value with the predetermined value, however, it is also possible to detect the clamping malfunction by comparing, with a predetermined value, the current value of the first servomotor 33 read after the command for minute angle α rotation is given to the second servomotor 34, without detecting the electric current value of the first servomotor 33 before the command for minute angle α rotation is given to the second servomotor 34.

Furthermore, a clamping malfunction may also be detected by comparing a predetermined value with the amount of change in the electric current value before and after the rotation command is given, or with the electric current value after the rotation command is given, of the servomotor to which the rotation command of the minute angle α is given (the second servomotor 34).

Also, by providing means for converting the electric current value of the servomotor into a torque value, to have the controller determine any clamping malfunction based on the torque value converted from the current value.

The clamping malfunction detection method of the invention can effectively be implemented in any machine tools which process a work while rotating the both ends of the work by synchronously rotating main spindles by the servomotors, so that it is not limited to grinding machines, and it may also be implemented in a lathe etc. The configurations of the clamping mechanisms themselves are arbitrary, that is, they are not limited to hydraulic types, and they may also be electrical types.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A method for detecting malfunction in clamping a work within a machine tool, which comprises:
    a pair of headstocks that comprises claim mechanisms clamping both ends of the work, respectively; and
    a pair of servomotors synchronously rotating main spindles of the headstocks together with the work so as to machine the work,
    the method for detecting malfunction comprising:
    clamping the both ends of the work with the clamping mechanisms of the both headstocks;
    giving a command for a minute angle rotation to only one of the servomotor, while performing servo control on the servomotors;
    detecting current or torque generated in the servo motors; and
    determining malfunction in clamping when the detected current or the torque in either of the servo motors is smaller than a predetermined value.

2. A method for detecting malfunction in clamping a work within a machine tool, which comprises:
    a pair of headstocks that comprises claim mechanisms clamping both ends of the work, respectively; and
    a pair of servomotors synchronously rotating main spindles of the headstocks together with the work so as to machine the work,
    the method for detecting malfunction comprising:
    clamping the both ends of the work with the clamping mechanisms of the both headstocks, while performing servo control on the servomotors;
    detecting current or torque generated in the servo motors; and
    determining malfunction in clamping when the detected current or the torque in either of the servo motors is not smaller than a predetermined value.

3. A machine tool comprising:
    a pair of headstocks;
    a pair of clamping mechanisms provided on main spindles of the respective headstocks;
    a pair of servomotors which rotates the main spindles of the respective headstocks;
    a detecting unit which detects a current or torque of the respective servomotors;
    a machining unit which is movably provided so as to approach to and apart from a work clamped by the clamping mechanisms; and
    a clamping malfunction detecting unit,
    wherein the machine tool clamps the work by the clamping mechanisms, and machines the work by synchronously rotating the work together with the main spindles by the servomotors,
    wherein the clamping malfunction detecting unit detects malfunction in clamping in such a manner that:
    clamping both ends of the work with the clamping mechanisms;
    giving a command for a minute angle rotation to only one of the servomotor, while performing servo control on the servomotors;
    detecting current or torque generated in the servo motors; and
    determining malfunction in clamping when the detected current or the torque in either of the servo motors is smaller than a predetermined value.

4. A machine tool comprising:
    a pair of headstocks;
    a pair of clamping mechanisms provided on main spindles of the respective headstocks;
    a pair of servomotors which rotates the main spindles of the respective headstocks;
    a detecting unit which detects a current or torque of the respective servomotors;
    a machining unit which is movably provided so as to approach to and apart from a work clamped by the clamping mechanisms; and
    a clamping malfunction detecting unit,
    wherein the machine tool clamps the work by the clamping mechanisms, and machines the work by synchronously rotating the work together with the main spindles by the servomotors,
    wherein the clamping malfunction detecting unit detects malfunction in clamping in such a manner that:
    clamping the both ends of the work with the clamping mechanisms of the both headstocks, while performing servo control on the servomotors;
    detecting current or torque generated in the servo motors; and
    determining malfunction in clamping when the detected current or the torque in either of the servo motors is not smaller than a predetermined value.

* * * * *